United States Patent [19]

Pazel

[11] Patent Number: 6,028,999
[45] Date of Patent: Feb. 22, 2000

[54] SYSTEM AND METHOD FOR NON-SEQUENTIAL PROGRAM STATEMENT EXECUTION WITH INCOMPLETE RUNTIME INFORMATION

[75] Inventor: Donald Philip Pazel, Montrose, N.Y.

[73] Assignee: International Business Machines Corporation, Armonk, N.Y.

[21] Appl. No.: 08/740,744

[22] Filed: Nov. 4, 1996

[51] Int. Cl.[7] .................................................. G06F 11/00
[52] U.S. Cl. .......................... 395/704; 395/701; 712/227; 714/25; 714/37; 714/38
[58] Field of Search .................................... 395/701, 710, 395/703–704, 500; 712/227; 714/25, 27–28

[56] References Cited

U.S. PATENT DOCUMENTS

| | | | |
|---|---|---|---|
| 5,010,515 | 4/1991 | Torborg, Jr. . | |
| 5,050,068 | 9/1991 | Dollas et al. | 395/382 |
| 5,353,419 | 10/1994 | Touch et al. | 395/582 |
| 5,469,574 | 11/1995 | Chang et al. . | |
| 5,491,793 | 2/1996 | Somasundaram et al. | 395/183.21 |
| 5,659,679 | 8/1997 | Alpert et al. | 395/183.1 |
| 5,815,653 | 9/1998 | You et al. | 395/704 |
| 5,828,883 | 10/1998 | Hall | 395/704 |

OTHER PUBLICATIONS

Helsgaun, Keld "CBack: a simple tool for backtrack programming in C—the abstract" from Software: Practice & Experience [H.W. Wilson—AST] vol. 32, pp. 905–934, Aug. 1995.

Scavuzzo "Personal communicators require new processor & system architectures (Part 1)" from Computer Technology Review, vol. 12, Issue 16, Feb. 1993.

Mayer–Lindenberg "Three Interactive Programming Languages for Microcomputers—The abstract" from Microprocessing & Microprogramming, vol. 13, Issue 1, pp. 31–40, Jan. 1984.

van Vliet et al. "A hypertext development methodology—the abstract" from Journal of Database Management, vol. 4, Issue 2, pp. 18–29, Feb. 1993.

Wong "Using hypertext to manage software development—the abstract" a Computer Science Dissertations, UMI vol./Issue 33–06, 1994.

Alfred V. Aho et al., "Compilers, Principles, Techniques, and Tools", 3 Introductory pages, Chapter 7, pp. 389–462, Copyright © 1986 by Bell Telephone Laboratories, Inc., Addison–Wesley Publishing Company.

*Primary Examiner*—James P. Trammell
*Assistant Examiner*—Cuong H. Nguyen
*Attorney, Agent, or Firm*—Ryan & Mason, L.L.P.; Kevin M. Jordan; Wayne L. Ellenbogen

[57] ABSTRACT

A system and method for non-sequential program execution in an incompletely assembled runtime environment. In a program debugging context, a primary advantage is that neither a fully linked executable nor a complete code base is required to execute the program. As well, it is not necessary to begin execution at the traditional program entry point. Six key methods are described. Virtual execution initialization logic involves establishing the runtime environment within the context of the first statement of execution. Statement execution logic concerns execution of a program statement and a technique by which the runtime copes with incomplete information. Reset execution point logic allows the user to randomly reposition the current execution point within a program without violating the runtime environment. Finally, methods for adding and deleting callers into/from the runtime stack are outlined. Extensions for multi-process and thread support are outlined as well as the incorporation of standard and application libraries into the execution model.

40 Claims, 13 Drawing Sheets

SYSTEM AND METHOD FOR NON-SEQUENTIAL PROGRAM STATEMENT EXECUTION WITH INCOMPLETE RUNTIME INFORMATION

I. FIELD OF INVENTION

The present invention relates to program debugging systems. Specifically it relates to tools for finding and eliminating errors in user programs.

II. BACKGROUND OF THE INVENTION

Over the past 30 years, the problems for effective software development have been well studied. Some have approached the problem from the language viewpoint by developing rich semantics which encapsulate a high degree of well-tested functionality, thereby accentuating reuse. Some have approached the problem from an organizational viewpoint, and have focused on the phases of software development within an organization and how to manage software development effectively.

While all of these approaches resulted in contributions to enhanced software development productivity and quality, as yet there are no fail-safe techniques which render the phases of testing and debugging obsolete. If anything, these improvements have made software development more difficult to conduct and raised the importance of quality assurance. It has become more difficult due to the emergence of more complicated and richly semantic development languages such as C++, and by the increased complexity in applications with the introduction of parallel and distributed programming techniques. These enhancements have increased the importance of quality due to the increased reliability demands placed on vended component software in conjunction with the increasing competitiveness in the market for quality software. Many of the problems behind production software are inherent in the testing and debugging phases of a project. Usually software development is depicted as proceeding from the program routine (unit testing) level to a coherent sub-program (component testing) level to the full program (integration testing) level. In fact, this testing fluidity is the exception in practice. In many cases, logic testing at the unit level cannot be satisfactorily achieved until final integration. This is due to the fact that the complexity or quantity of information required to adequately drive unit testing cannot be exercised without invoking a suite of software larger than the unit but smaller than the integration.

A common approach to dealing with this problem is to build additional software that can in some manner fabricate input data for a given program unit. This technique, called "scaffolding", does aid in the testing and development cycle in exercising unit programs. It has several drawbacks however. One is that variation in the complexity of test data is usually limited. This is mainly a matter of practicality. Due to the fact that building scaffolding is a "detour" from the project's development and typically does not warrant priority for that flexibility, resources are less likely to be spent on scaffolding than on the project's program. The bigger problem is that building scaffolding augments development costs. As such, it is important to cost accounting and schedules to reduce this expense as much as possible—especially since the scaffolding program is not properly part of the product and essentially is "throw-away".

In large part, the problems described above are exacerbated by the fact that programming tools are not flexible enough to facilitate testing through the various stages of the programming cycle. Tools such as debuggers generally require that the application be built fully, if not partially with scaffolding, in order to be applied to problem resolution. In many ways this is due to a debugging tool designed to runtime requirements. That is, programming tools are designed for execution environments, which to operate reasonably need to be complete and consistent.

The upshot of all these scenarios is that project uncertainties and anxieties are pushed to the later development phases. It is only by putting all the pieces of an application together that a realization and understanding of all its problems emerges.

III. SUMMARY

In accordance with the aforementioned needs, the present invention is directed to a system and method for constructing a program error detection tool herein referred to as a "virtual debugger." The virtual debugger aids in alleviating many of the foregoing problems by allowing testing of complex program units to be conducted prior to component or integration testing, and even prior to the component development completion. This is achieved through "non-sequential program statement execution" in an incompletely assembled program runtime environment.

By non-sequential program statement execution it is meant that the user is allowed to execute program statements in almost any order, with no necessity to begin at the program's initial entry point. This is facilitated through a modification of the program's runtime environment in which it is not essential for all program stack nor global and local variable information to be instantiated. It is in this sense that the runtime is incompletely assembled. It is still essential that the runtime information be logically consistent, as in having the calling sequences represented in the stack reflect a true calling sequence for example, but it is not necessarily complete. The statement that is selected to execute, drives the assembly of the runtime. Stack entries may be added and deleted as necessary for example. Also, in the event that insufficient information is available for statement execution, requests may be made for that information from the user by way of the virtual debugger tool, thereby further assembling the runtime.

It is this that distinguishes the virtual debugger from a traditional debugger. In the latter, execution necessarily begins at the application's initial entry point. From that point, the runtime state is derived from the execution of logically successive program statements. In virtual debugging, the initial entry point may be any statement within the application program. While successive runtime states may be derived through logically successive program statements, a user may radically alter the program state through adding and deleting callers from the current runtime state, jumping to a statement other than the next logical statement for execution, etc. The runtime will adjust its consistency accordingly. A further advantage, is that the runtime can detect memory protection violations as well as the use of uninitialized memory.

The point behind this flexibility is that in having an incompletely assembled runtime, it is not necessary to have the entire application program source available for execution. Since the runtime's consistency adjusts to the current program statement, it is not necessary to execute from the program's beginning. Through a combination of both facets, a user may test code during development with little or no dependency on other program components having been developed. In that spirit, a preferred, although not exclusive, application of this invention is the thorough detection of errors. Speed of execution is less a focus than the detection of program errant behavior.

This invention embodies a set of required components and methods that produce and manage program and runtime information to these ends. The system includes a programming language interpreter along with data dictionaries for the global and local data. It also includes a runtime environment which maintains the program's call stack and data instances. Another aspect monitors all allocated or otherwise used memory. Methods include the set of basic primitives which form the foundations of virtual debugging concepts. These include logic for system initialization, virtual execution initialization, statement execution, resetting execution point, inserting a caller into the stack, and removing a caller from the stack.

Further extensions to the invention allow complex test data to be defined and incorporated into execution. It also addresses how to incorporate application program library information into the execution, as well as extension to threaded and multi-process runtime models.

IV. BRIEF DESCRIPTION OF DRAWINGS

For further features and advantages of the present invention will become apparent by reference to the detailed description and accompanying drawings, wherein:

FIG. 1 displays an overview of a virtual debugger having features of the present invention;

V. DETAILED DESCRIPTION

Figure 1:
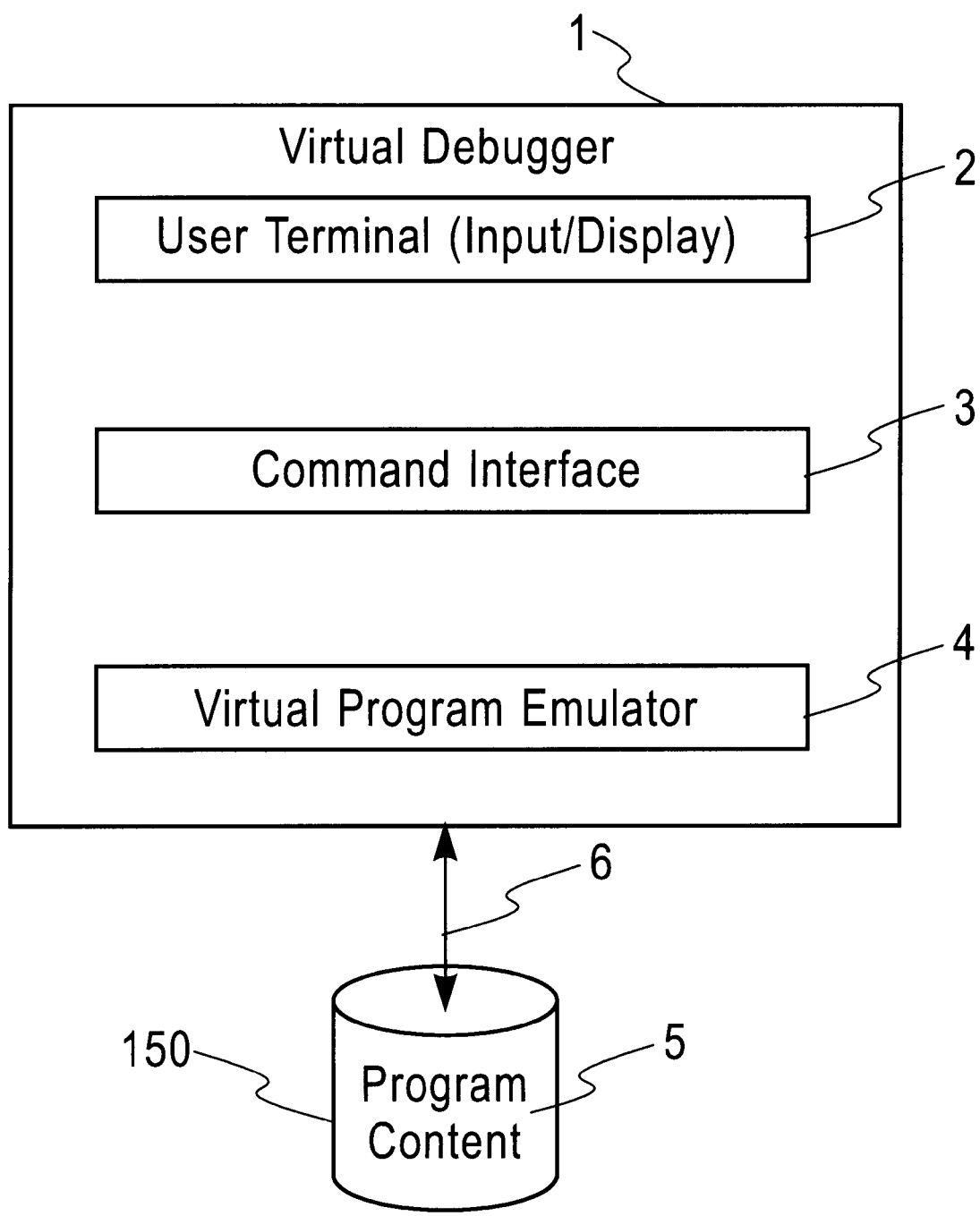

FIG. 1 shows an example of a computer system in accordance with the present invention. As depicted, the virtual debugger 1 comprises three components—a user terminal 2, a command interface 3, and a virtual program emulator 4. The user terminal 2 includes conventional input devices and a display. This enables the tool's user interface, providing a means for the user to view and control the state of the debugged program. Input devices include keyboard, mouse, joystick, or any other which may be enabled through the virtual debugger's user interface implementation. The user terminal 2 implementation provides the conventional program logic needed to control and display the state of a debugged program in this tool. Details of the user terminal 2 and its implementation are not integral to the description of this invention and thus will not be discussed further.

The command interface 3 provides a means by which the user input from the user terminal 2 is translated into well defined actions for the virtual program emulator 4. It also provides function for managing the virtual debugger tool independently of details relevant to the virtual program emulator 4. This would include details such as user preferences, and options. Thus this component serves as an intermediate step to the virtual program emulator and as a controlling device for the tool's general behavior. Neither of these well-known aspects are integral to the description of this invention and are not discussed further.

According to the present invention, the virtual program emulator 4 contains the logic to debug a program in an incompletely assembled runtime environment, and is the primary focus of discussion here. The emulator 4 component takes as input 6 the embodiment of a user program referred to as the program content 5. This content provides all the program information needed for the emulator 4 to debug the program. The format of the content 5 may take the form of programming language statements, or as pre-processed program information as long as all referenced program semantic information (e.g. data structures, statements) may be extracted by the virtual program emulator from it. The means for acquiring this information may be through standard operating system access methods from locally attached or remote network attached storage media 150 (e.g., static or dynamic memory, disk, CD-ROM, tape). For this embodiment it is assumed that program content may be partitioned into code items, where a code item is a self-contained parsable unit. This allows a paradigmatic similarity with file based program management systems to facilitate discussion here.

Figure 2:
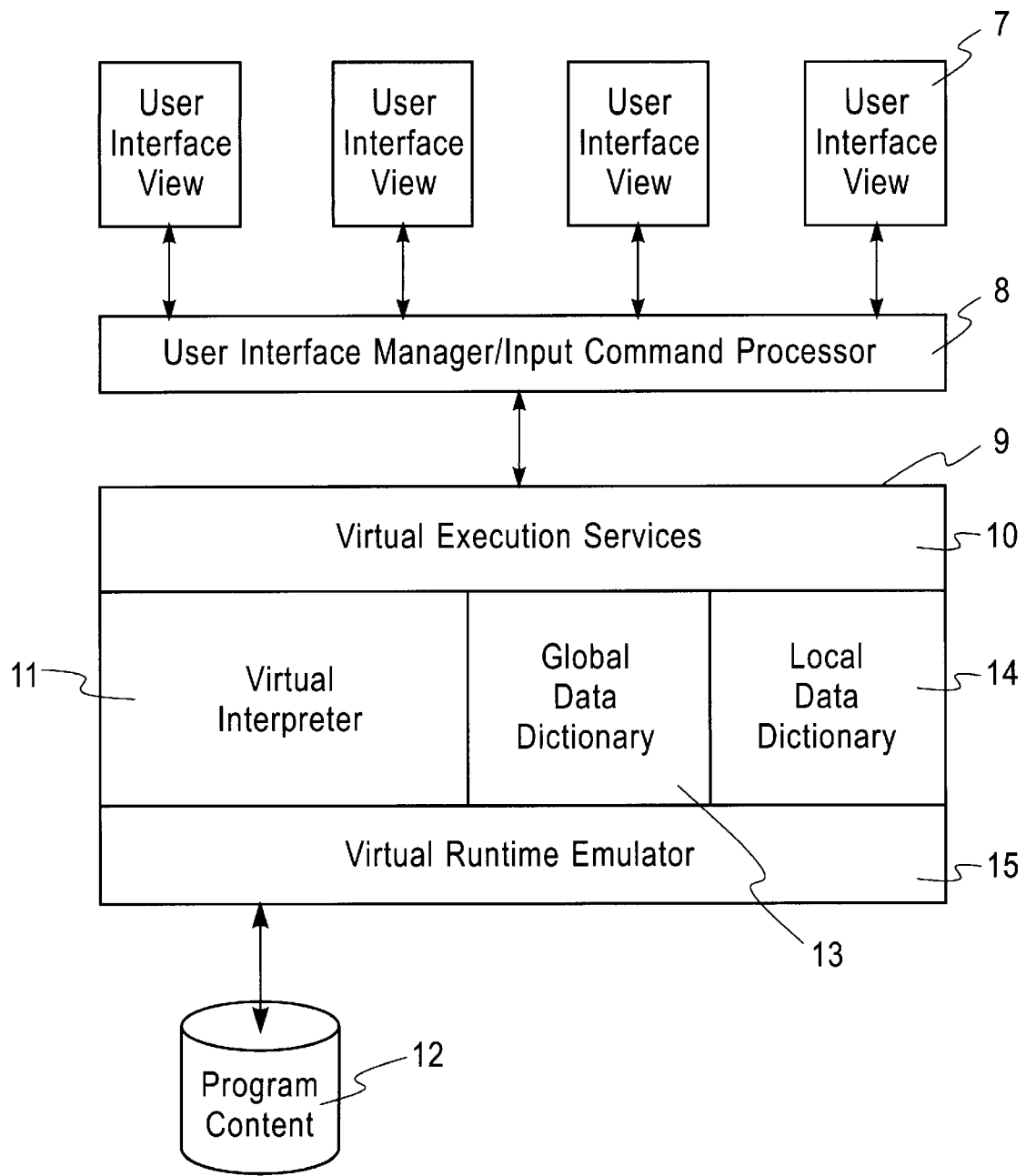
FIG. 2 depicts an example of the virtual program emulator of FIG. 1.

FIG. 2 depicts a more detailed example of the components of the virtual debugger 1, their relationships, and brings focus to the component composition of the virtual program emulator 9. The conventional user-interface views 7 provide user information about the current state of the debugged program. They also provide a means for the user to enter commands textually or graphically. The conventional user interface manager/input command processor 8 both manages the user interface (adjusts windows, colors, etc) and intercepts user input. User input that affects the tool's presentation or general behavior is handled by this component. The user input that affects the state of the debugged program is passed to the virtual program emulator 9.

The virtual execution services 10, a component of the virtual program emulator 9, interprets commands from the user interface manager/input command processor and specifies actions to the other components in an attempt to execute the command. The virtual interpreter component 11 is able to read and parse the program content 12. The program content 12 consists of program data in a format that the interpreter 11 is capable of reading and parsing. The virtual interpreter 11 processes this information and attempts to execute program statements. A further result of this processing is the construction of two distinct data dictionaries, namely the global data dictionary (GDD) 13, and the local data dictionary (LDD) 14. The global data dictionary 13 provides information about the structure and location of program routines and application-wide program definitions. For routines, this includes for example the names of the program routines and, according to the present invention, their content relative location (e.g. file/line number). For definitions, it includes for example similar information about all data types globally accessed across the application. The local data dictionary 14 contains detailed information about program routines, usually the ones whose execution is current, or appears on the program call stack. Information here typically includes a mapping of executable program statements to content relative location, local variable and parameter type information, and any program semantic structural information relevant to the routine, e.g., nested computational units also called contexts. An exemplary GDD 13 and LDD 14 will be discussed with reference to FIGS. 3 and 4, respectively.

Returning to FIG. 2, the virtual interpreter 11 interprets executable program statements. The resulting program runtime state is managed by the virtual runtime emulator 15. The virtual runtime emulator 15 maintains the program call stack as well as simulates memory allocation and contains global variable instances. It holds within the stack, information about each routine such as local variable instances, and context information. What distinguishes this runtime from traditional execution runtimes is the incompleteness of this information. A characterization of this incompleteness and how the interpreter interacts with the interpreter 11 is discussed below.

Data Maintained by the Global Data Dictionary

By way of overview, the global data dictionary 13, maintains program information that generally applies application-wide. This includes application routines, global data definitions and global data variable definitions.

Application routine information is maintained as locations of application routines relative to the program content containing them. Retaining all detailed information about the structure of the routine would be impractical and contrary to the role of the GDD 13. The local data dictionary does that selectively. Routine location information allows the global data dictionary to provide several important functions for virtual debugging. For example, the virtual debugger can provide a list of application routines in the user interface through which the user may navigate source code. Also, utilizing the stored locations in the program content, the interpreter 11 can directly position to a routine, speeding up the parsing process for it.

Additionally, by maintaining global data types and global variables, the global data dictionary 13 allows this important and often referenced information to be readily available. Also, this (as well as the routine information mentioned above) may be maintained incrementally. That is, it is acquired only as driven by the debugging which drives the interpreter 11. Therefore, the global data dictionary is incomplete in a total sense, but complete within any local context of debugging.

The Virtual Interpreter

The virtual interpreter 11 is built upon designs found in standard compiler and interpreter technology. According to the present invention however, the parser and interpreter are preferably combined. Whereas in many designs these provide separate functions with the parser producing byte code which the interpreter executes in a separate phase, it is assumed here that the parser and compiler may synergize in the same component. It is assumed that the parser may be invoked alone to produce dictionary information from program content, or that it may be invoked in conjunction with the interpreter to produce standard execution trees, and execute them immediately. Execution trees consist of operation nodes (e.g. addition, division, comparisons, etc.) and data acquisition nodes (get/put values into variable instances). The interpreter executes the tree in a top down fashion.

It is also assumed that given a routine's location within program content along with the global dictionary initialized with data from the routine's code item, that the parser/interpreter is capable of parsing that routine starting at the given location point. This facilitates the design of the virtual debugger, and is a matter of efficiency rather than necessity.

The design of the combined parser/interpreter is largely based on putting together pieces of standard components and utilizing techniques from compiler and interpreter technology. While being a preferred component of this invention, the design of this component in itself offers no innovation and thus will not be discussed further.

Figure 3:
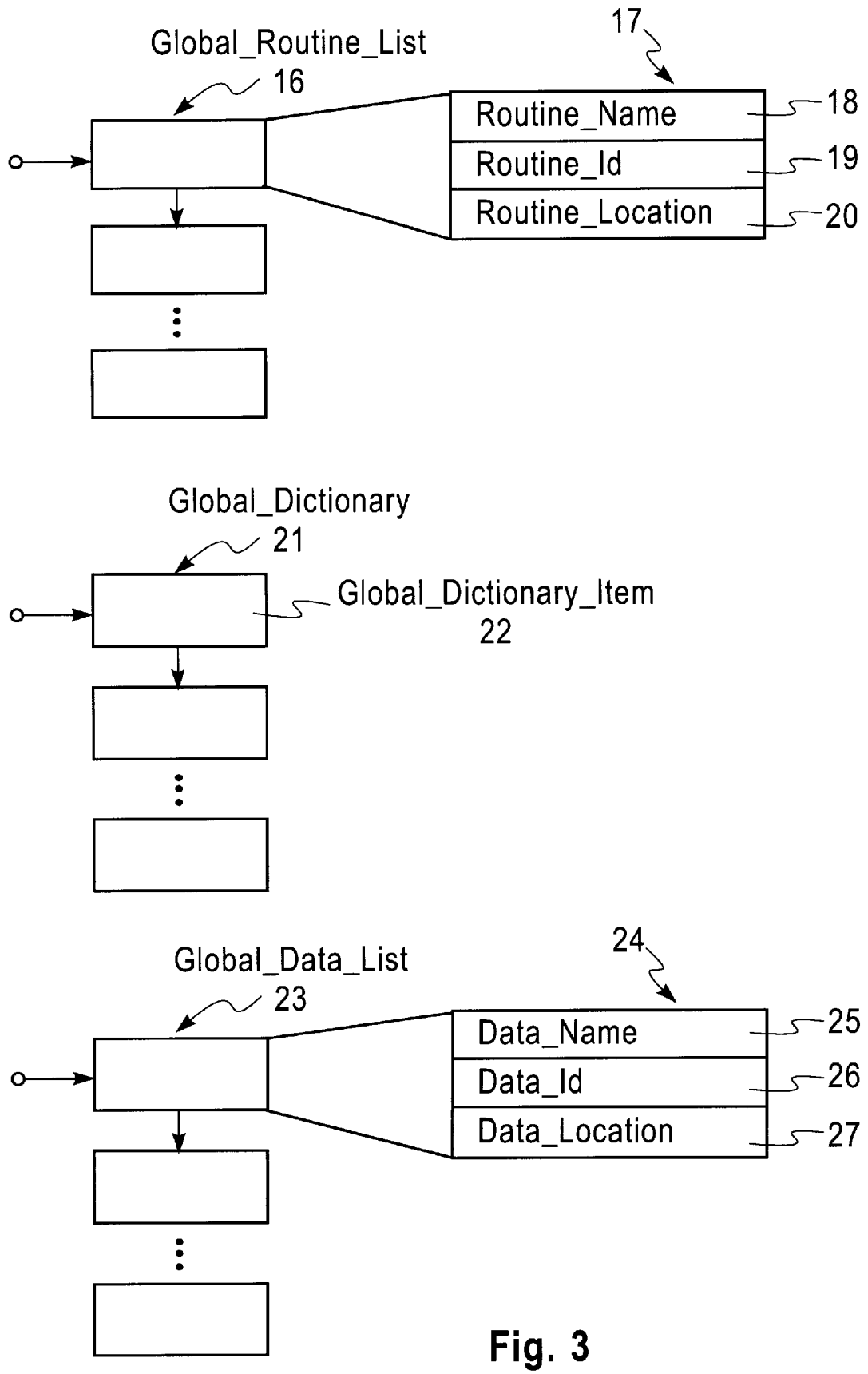
FIG. 3 depicts an example of the global data dictionary of FIG. 2.

FIG. 3 depicts an example of the information maintained by the global data dictionary 13. As depicted, the global routine list 16 provides a list of global routine items 17, each containing details about each routine in the application. Each global routine item preferably contains the routine's name 18, a unique reference identifier 19, and the routine's location 20 within the program content.

The routine name 18 is the textual name of the routine. The unique reference identifier 19 is manufactured and assigned by the global data dictionary during parsing. Finally, the routine location 20 is determined during parsing and is related to how the program is stored in the program content. For example, if a program resides within a file system, that routine's location 20 would indicate the file name, line number, and column number where the program text for that routine starts.

The global dictionary 21 holds data type information. The global dictionary consists of a set of dictionary items 22. Each dictionary item contains information such as data type, data aggregation (e.g. structure, union), and data layout. This type of information is typical for data dictionaries used in compiler technology, and is not discussed in detail here.

The global data list 23 holds global data variable definition information. The global data list includes a set of global data items 24. Each global data item has a data variable name 25, a unique data identifier 26 assigned by the global data dictionary, and a reference to the dictionary item 27 describing the type of the global data.

It should be re-emphasized here that the global dictionary is not initialized with all the application's global data information. Global data information is incrementally built based on the needs of the debugging session by way of the virtual interpreter 11. More precisely, when a code item in the program content 5 is read the first time, the global data information from that code item and its dependent referenced (included) code items is stored in the global data dictionary if it is not already there. The selection of code items read and their order is driven by the virtual debugging session through the interpreter 11. Thus, the interpreter 11 will certainly have access to the global data information it requires from the global data dictionary to successfully parse and execute its current statement.

A procedure for reading a code item into the global data dictionary 13 will now be described. This is a utility routine for the main actions to be described with reference to FIG. 7. This routine reads and parses a program, and in doing so, picks out dictionary items 22 and global data items 24 and adds them to the global data dictionary 13. It also picks out the routines in the program and stores them as global routine items 17 in the global routine list 16.

Procedure: Read Code Item into Global Dictionary
Input: Identity of code item to parse
Begin_Procedure:
  While parsing code item
    On case "statement type"
      case "Variable Type Information":
        If type is not in global dictionary
          Create a dictionary item
          Add dictionary item to global dictionary
        End_If
        continue
          case "Variable Instance Information":
            If instance is not in the global data list
              Create a global data item

```
            Assign the data item's name
            Assign a unique identifier
            Assign the appropriate dictionary item describing its type
            Add global variable item to global variable list
         End_If
         continue
      case "Routine Statement":
         If routine is not in global routine list
            Create global routine item
            Assign the routine's name
            Assign a unique identifier
            Assign the routine's location within code item
            Add global routine item to global routine list
         End_If
         continue
      case "Included code item":
         Call "read code item into global dictionary" on referenced
            code item /*recursive*/
         continue
      Default:
         continue
      End_On_Case
   End_While
End_Procedure
```

Data Maintained by the Local Data Dictionary

By way of overview, the local data dictionary 14 preferably maintains detailed information about individual application routines. This includes the location of individual executable program statements, local variables, and the context structure of the routine. The location information allows the interpreter 11 to acquire quick access to executable statements. Local variable information and a nested context structure information allows the virtual runtime an easy way to set up its stack when any statement in a routine is to be executed.

Figure 4:
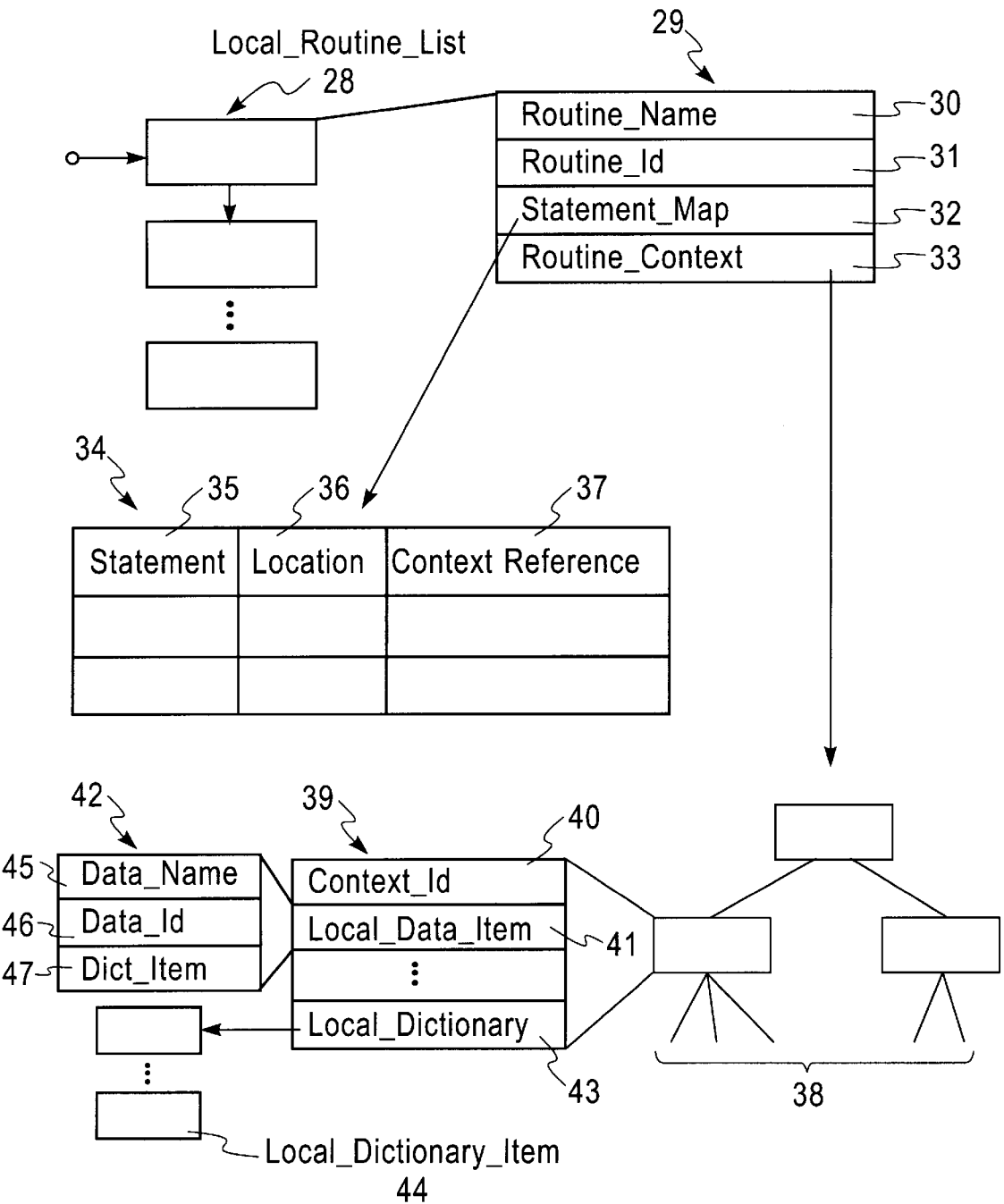
FIG. 4 depicts an example of the local data dictionary of FIG. 2.

FIG. 4 shows an example of the information maintained by the local data dictionary 14. The local routine list 28 points to a list of local routine entries 29, each of which contains program information about the respective routine. A routine entry has a routine name 30, a unique routine identifier 31 assigned by the local data dictionary, a pointer to the statement map 22, and a pointer to the context tree 23.

The statement map 34 consists of a table of information relating each statement 35 in the routine to its location 36 in the program content and it associated context reference 37. A statement's location 36 is identified during parsing and is related to where the program statement is stored in the program content. For example, for a program residing within a file system, a statement location within that program would indicate the file name, line number, and column number where the program text for that statement starts. The context reference 37 is discussed below.

A context 39 represents a nested set of executable statements within a routine. Any given routine is structured into a single-rooted tree of contexts. Each context maintains a set of variables local to it, and all variables within a context are programmatically visible to it and to all contexts nested underneath it. In other words, these are the local variables defined within that context. Returning to FIG. 4, Routine_Context 33 points to a tree of context structures 38. Each member of the context tree 38 is called a context 39. Each context 39 has a unique context identifier 40 assigned by the local data dictionary. It also has an array 41 of data items 42 which hold information about the local variables within that context 39. The context also has a pointer 43 to a set of local dictionary items 44 representing data types defined within this context. Much like the global dictionary item 22, the local dictionary item 44 describes a data type and the data layout of that type, and is again typical of information maintained by data dictionaries in compiler technology, and thus is not discussed in further detail herein. The context reference 37 is a reference to one of the contexts 39 in the context tree 38.

Each data item 42 within a context has a data name 45 holding the name of the local variable, a unique identifier 46 assigned by the local data dictionary, and a pointer to a dictionary item describing the type of the variable. This pointer may refer to a dictionary item from the global dictionary or from some context's local dictionary. Furthermore, we may assume for convenience that the root context in the context tree contains information relevant to the input and output parameters of the routine within its Data_Item array.

As a policy, the local dictionary 14 may maintain information about any routine as long as that routine is involved in the execution, i.e. is referenced on the runtime stack. This is due to the likelihood of its being referenced again as the stack is unwound. If the virtual runtime has no logical need for information about a particular routine within the local dictionary, that information may be discarded from the local dictionary and re-constructed as needed later. While not entirely essential to design, this policy represents a trade-off of memory usage versus processing time within the virtual program emulator 9, and as an optimization issue is not discussed further here.

A procedure for parsing a routine into the local data dictionary 14 will now be described. This is a utility routine for the main actions to be described later with reference to FIG. 7. This routine is used to parse a program routine. It picks out and identifies all executable statements 35, their locations 36, and their associated program context 37, and puts that information into the statement map 34. It constructs the program contexts 39 and builds the context tree 38. For each context, it builds its associated dictionary items 44 describing new program semantic types. It also builds data items 42 defining local variable instances within the context 39. All this information comprises the local data dictionary 14. It is assumed that parsing occurs on some code item containing that routine.

```
Procedure: Parse Routine into Local Dictionary
Input: Code item for routine and location of routine within code item
   Begin_Procedure
      Position interpreter to read at location of routine within code item
      Read routine declaration
      Create local routine entry
      Assign Routine_Name from parsed declaration
      Find associated global routine item in global dictionary
      Assign Routine_Id from global routine item
      Add local routine entry to local routine list
      Build root context
      Assign unique context identifier
      Install parameters as local variables
      Assign context as current context
      Assign context to Routine_Context
      while parsing routine
         On case "statement type"
            case "New Context":
               Build context and insert into context tree
               Assign unique context identifier
               Assign as current context
               continue
            case "Executable Statement":
               Add statement information to statement map
                  specifying the statement identifier or number, and location
               Assign context identifier from current context
               continue
```

-continued

```
case "New Type":
  Build Dictionary_Item
  Insert Dictionary_Item into local_Dictionary in current context
  continue
case "Local Variable":
  Build Data_Item
  Assign the variable's name to Data_Name
  Assign a unique identifier to Data_Id
  Assign a reference to the appropriate dictionary item for the
    instance's type to Dict_Item
  Add Data_Item to Local_Data_Item in current context
  continue
Default:
  continue
End_On_Case
End_While
End_Procedure
```

Data Maintained by the Virtual Runtime Emulator

By way of overview, the virtual runtime emulator 15, preferably maintains information about the execution state of an application program. This includes memory management, local and global variable management, and program stack maintenance. According to the present invention, the virtual runtime emulator does not require execution to begin at application entry, and also does not require as much information to exist within it. It only needs what is essential to execute the current statement and in that sense it is incompletely assembled.

Figure 5:
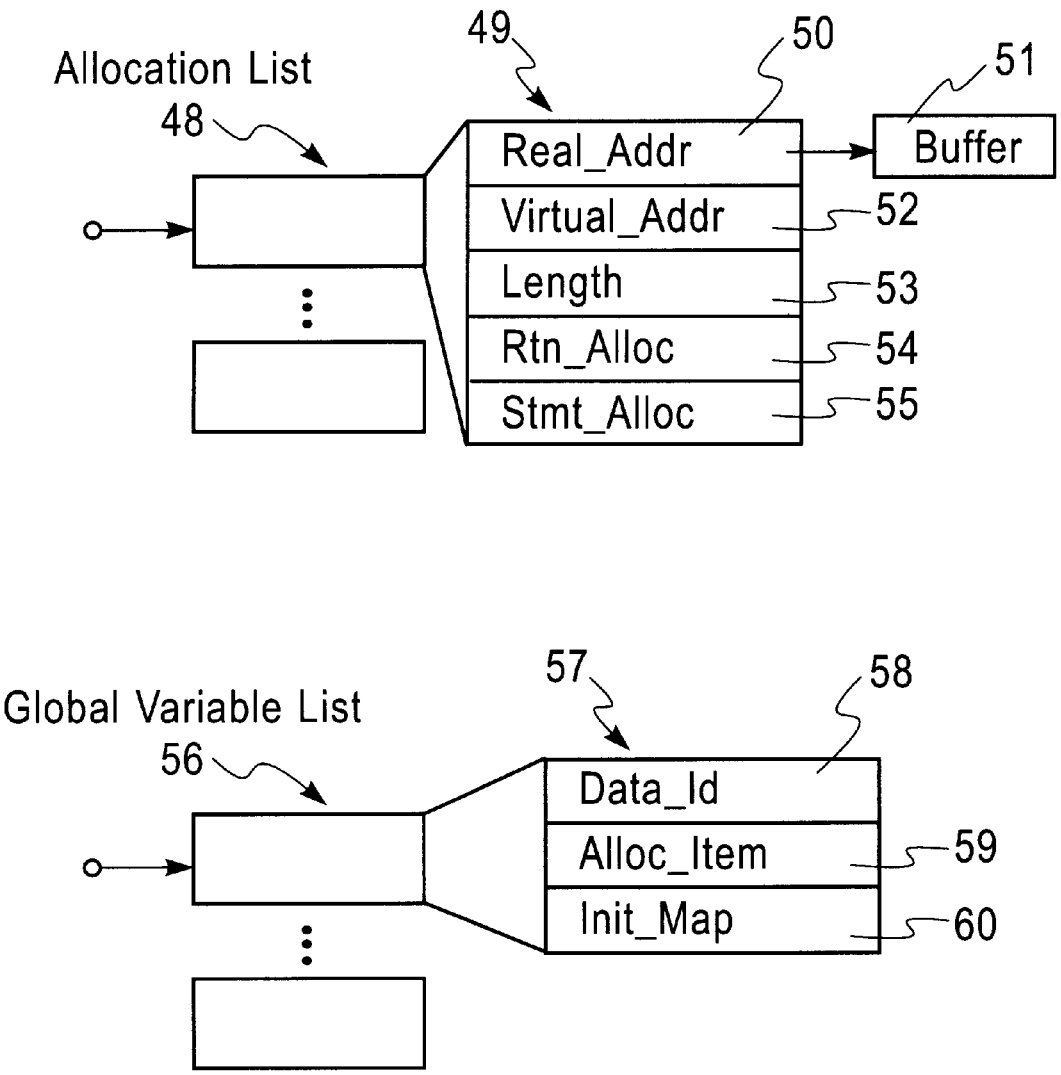
FIG. 5 depicts the management of virtual memory by the runtime as well as the management of global variable instances.
Figure 6:
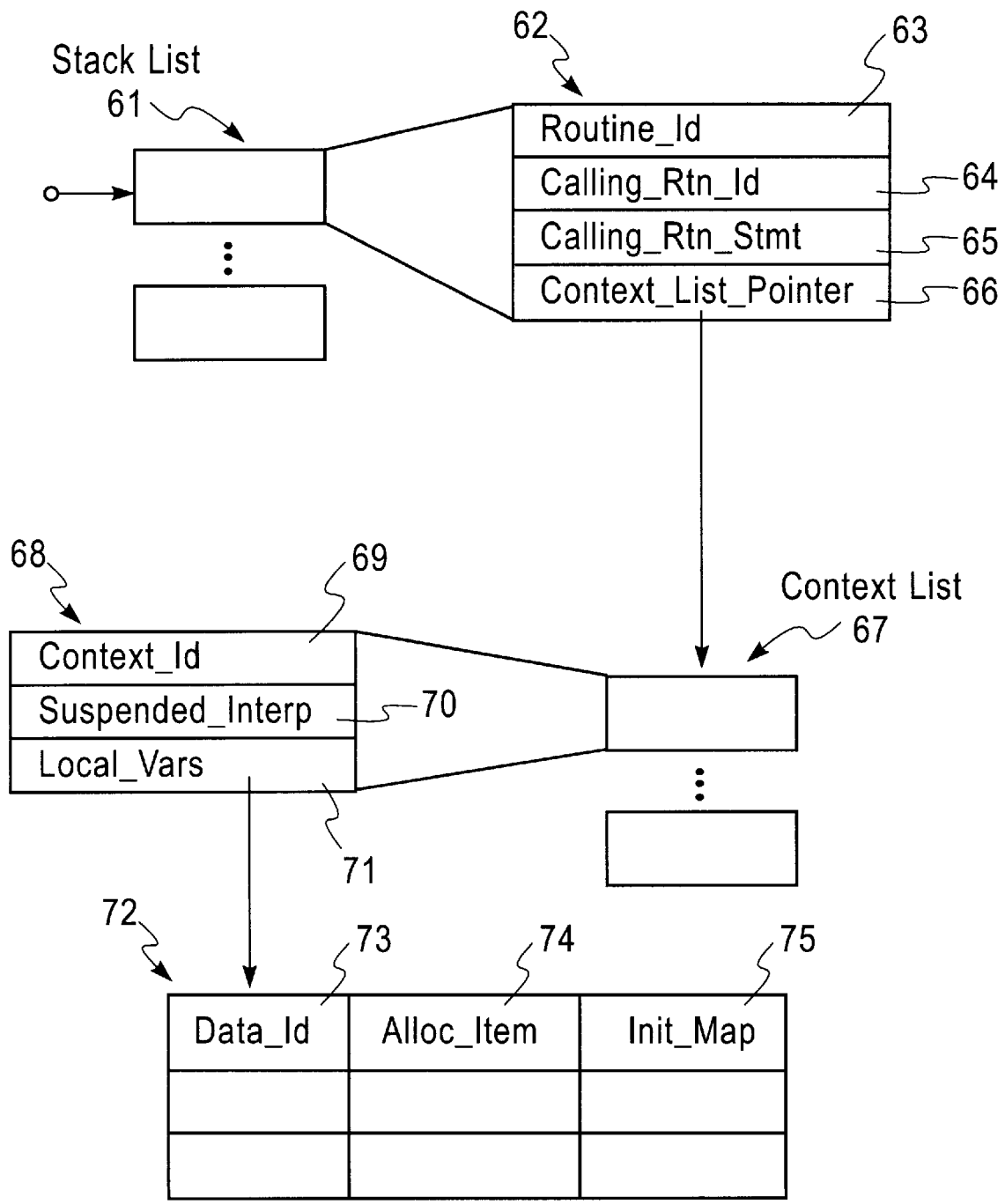
FIG. 6 depicts a virtual runtime stack having features of the present invention.

FIGS. 5 and 6 illustrate examples of the information maintained by the virtual runtime emulator 15. FIG. 5 depicts virtual memory management and global variable management. FIG. 6 depicts stack maintenance which includes the maintenance of local variable instances.

As an error detection tool, virtual debugging concerns the use or abuse of application memory, allocated or otherwise. Therefore the virtual runtime 15 contains a memory management system that provides enough structure to detect memory protection violations or over-writes. This is achieved by monitoring or tracking all utilized memory. For any memory utilized by the program, a corresponding memory buffer is allocated within the virtual runtime. A virtual address is also assigned for the application program to reference it. This is done to simulate the sequential placement of memory in a real machine making it more realistic for detecting errors such as over-writing the program stack. The combination of real buffer and virtual address is recorded and monitored by the virtual runtime.

FIG. 5 depicts examples structures used for virtual memory management and global variable management in accordance with the present invention. As depicted, the allocation list 48 includes a list of allocated items 49. Each allocation item 49 has a real address which points to a real allocated buffer 51 for the application to use. This memory is assigned a virtual address 52 which is used by the application to reference the buffer 51. The allocated item 49 also records the length 53, as well as the routine identifier 54 of the routine that allocated or owns that memory, and the statement identifier within the routine 55 that allocated that memory. This information is useful, for example, to pinpoint the location of errors detected during execution.

The global variable list 56 tracks all global variable instances utilized during execution. This usually comprises a subset of all global variable instances in the program, since virtual debugging does not require all this information at once. This data set is only as large as necessary for execution to proceed, and grows to accommodate further execution. This list consists of a set of global valuable items 57. Each global variable item contains a data identifier 58 which matches to a global data item found in the global data list 23. It also points to an allocated item 59 which holds the associated data value. The init_map field 60 is a structure for determining which fields are initialized, that is, have or have not been set by the application program. The init_map structure is much like the dictionary item structure referred to by the data_id 46, except that each field has a value indicating whether the field has been set by the application (True) or not (False). The structure of this artifact is much like that found in data dictionaries in compiler technology and will not be discussed further.

FIG. 6 illustrates an example of a structure of the runtime stack in the virtual runtime emulator 15 in accordance with the present invention. The stack list 61 consists of an ordered set of stack entries 62. The order of the list reflects the called-by order that could have occurred during execution with the top stack entry corresponding to the current routine being executed. Note that in virtual debugging it is not necessary for the bottom stack entry to correspond to the real entry point of the application program. The bottom entry only reflects where execution in debugging began. It is required however, that between the bottom and top entries, the stack is consistent as a logical calling sequence within the application program.

Each stack entry contains the global identifier of the routine 63 as maintained by the global data dictionary. It also contains the global identifier of the calling routine 64 and the statement identifier or number 65 within that routine from which the call was made. It also contains a pointer 66 to the list of nested execution contexts 67 which encapsulate the state of execution within that routine. This context list is an ordered list of execution stack contexts 68. Execution stack contexts are executing versions of contexts 39 as defined in the local data dictionary. The top entry corresponds to the execution context that is holding the current statement of execution, while the bottom entry is the execution context at entry into the routine.

Each stack context has a context identifier 69 corresponding to the context identifier 40 of the defining context 39 from the local data dictionary. It also contains a field 70 to hold the execution state of the interpreter when the executing statement issues a call (details of this will be discussed later) that results in a successive stack entry. It also contains a pointer 71 to a local variable table 72. The local variable table contains details about each local variable instance within a given execution context, each row of the table corresponds to a local variable instance. Each row of the local variable table has a field Data_Id 73 corresponding to the same Data_Id 46 defining that local variable in the local dictionary. Another field holds an allocated item 74 containing the value of that local variable instance. The Init_Map field 75 is used for determining which fields within the instance have been set by the application program or not, and is identical to that discussed for global variable items 60.

An exemplary procedure for building a virtual stack entry 62 will now be described. This is a utility routine for the main actions to be described with reference to FIG. 7. This routine creates and initializes a stack entry 62 for the stack list 61 in the virtual runtime. It initializes the entry's context list 67 and initializes the local variable tables 72.

```
Procedure: Building a Virtual Stack Entry
  Input: Identity of routine being entered and statement identifier,
    and caller (routine identifier and statement identifier)
  Begin_Procedure
    Create stack entry
      Find associated global routine entry in global data dictionary
      Assign Routine_Id from global routine entry
      Assign identifier of calling routine and statement identifier
```

```
                                -continued where call made
    Locate branch of context tree in local data dictionary for
        routine from root to context holding routine statement
    Assign the state of the interpreter to Suspended_Interp
    For each context in branch starting at root
        Create a stack context and add last to context list
        Assign context id from context in local data dictionary
        For each local variable in context
            Add a row to local variable table
                Assign the data identifier found in local data dictionary
                    to Data_Id
                Construct an appropriate allocated item and assign to
                    Alloc_Item
                Construct and set an appropriate initialization map and
                    assign to Init_Map
        End_For
    End_For
End_Procedure
```

Detailed Description of Methods of Execution

Figure 7:
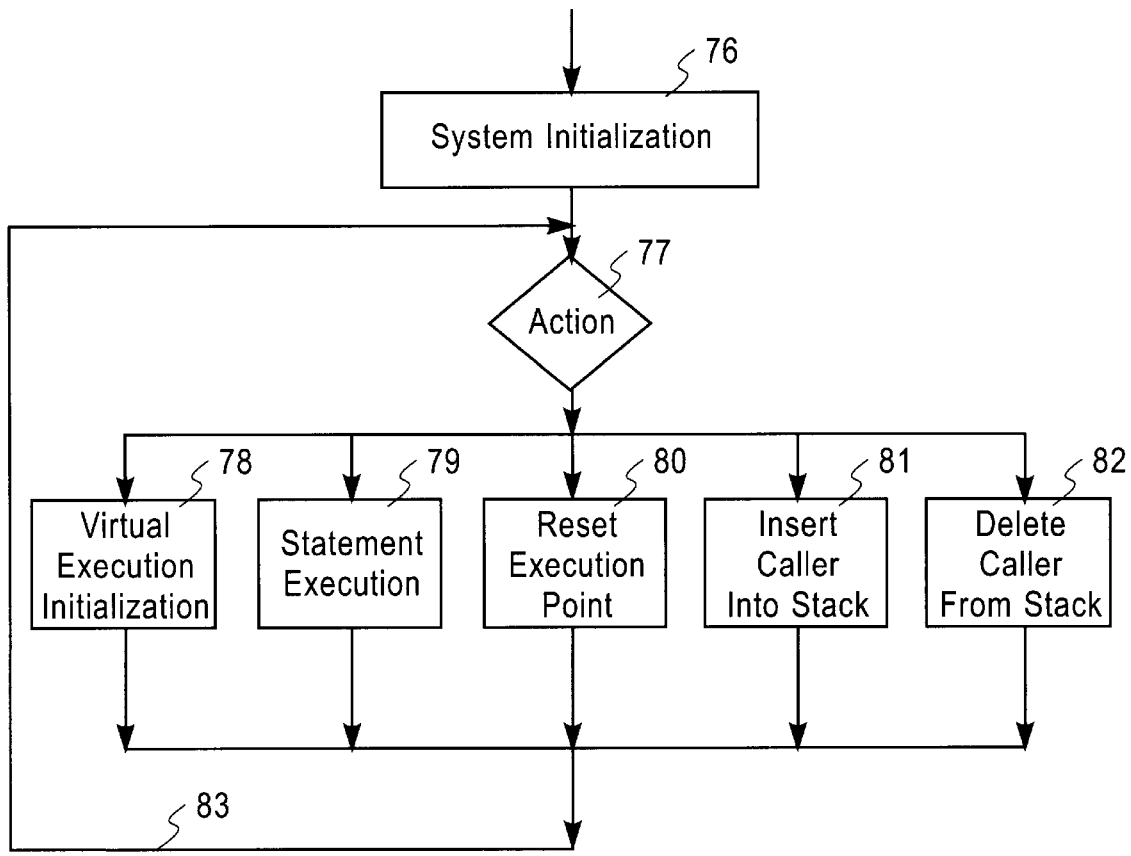
FIG. 7 depicts an example of the virtual runtime services of FIG. 1.

FIG. 7 depicts an example of the virtual execution services 10 logic. As depicted, the methods of execution include logic for system initialization 76, virtual execution initialization 78, statement execution 79, resetting execution point 80, insert caller into stack 81, and deleting caller from stack 82. These will be described later in detail. Recall also the three low-level utility procedures described earlier that read a code item into the global data dictionary 13, read a routine into the local data dictionary 14, and build a stack entry 62.

The logic that dictates these actions is found in the virtual execution services 10 component in the virtual program emulator 9. Referring again to FIG. 7, after system initialization 76, a decision is made which action 77 should be taken (based on user input or other criteria). The actions are virtual execution initialization 78, statement execution 79, reset execution point 80, insert caller into stack 81, and delete caller from stack 82. After that, logic returns to the action decision point 77 for iteration.

The following pseudo-code describes an example of the system initialization 76 logic having features of the present invention. Note that there is no need to set up runtime global instances until needed or requested. This routine initializes the virtual program emulator 9. It reads in a user specified list of code items, and parses these into the global data dictionary 13.

```
Procedure: System Initialization
    Input: A set of user-specified code items for pre-analyzed into the system, allowing easy
            reference to existing routines.
    Begin_Procedure
        for each code item in user specified list
            Read code item into global dictionary         /* utility procedure */
        End_For
    End_Procedure
```

The following pseudo-code describes an example of the virtual execution initialization 78 logic having features of the present invention. This routine may be called at the first virtual statement execution. It initializes the virtual stack list 61 with an initial stack entry 62 using information from the specification of the initial program statement to execute. It is assumed that the stack list 61 is empty.

```
Procedure: Virtual Execution Initialization
    Begin_Procedure
        Build a virtual stack entry based on routine and statement number   /* utility procedure */
            Position interpreter to beginning of statement
            Insert stack entry into Stack_List in virtual runtime    /* FIG. 7a and procedure */
    End_Procedure
```

The following pseudo-code describes an example of the virtual statement execution 79 logic having features of the present invention. This routine may be used to execute a routine's statement. It reads and updates information about the global variables in the global variable list 56, and local variables in contexts 39 found in local routine entries 29. It executes operations on data as defined by the statement semantics. On missing or erroneous information, it informs or asks the user for further information.

```
Procedure: Virtual Statement Execution
    Input/Assumption: Interpreter is positioned at executable statement
    Begin_Procedure
        Reset interpreter state for executing new statement
        If context has changed
            Delete stack contexts to first context that is to remain
                Add new contexts until context is found that contains statement
                (refer to Building virtual stack item for related logic)
```

-continued

```
End_If
While computing on execution tree
  On case tree-node type
    Case "Operation":
      Perform operation
        If error
          Report error and ask user for information
            If new data values specified and set
              return to top of while-loop to repeat execution of this operation
            End_If
        End_If
        If assignment to a variable instance
          ensure that Init_Map has corresponding variable is set to True
        End_If
        continue
    Case "Read Value of Data Instance":
      If global data and not in virtual runtime
        Build global variable item
        Locate global data dictionary item for type of data, assign to Data_Id
        Build appropriate allocated item and assign to Alloc_item
        Build appropriate initialization map and assign to Init_Map
          Add global variable item to global variable list
      End_If
      Retrieve value for this data
      if value has unknown state
        Ask the user for value
      continue
    Case "Reference Data Instance":
      If global data and not in virtual runtime
        Build global variable item
        Locate global data dictionary item for type of data, assign to Data_Id
        Build appropriate allocated item and assign to Alloc_item
        Build appropriate initialization map and assign to Init_Map
          Add global variable item to global variable list
      End_If
      Retrieve pointer value information
      continue
    Case "Call":
      If called routine not in global dictionary
        Ask user for code item of routine
        if none
          Ask user to provide results of call
        else
          Parse code item into global dictionary
        Endif
      If called routine not in local dictionary
        Parse routine into local dictionary
      Build virtual stack entry for calling routine
      continue
    case "Return":
      Remove top stack entry from stack list in virtual runtime
        Reset interpreter state to that found in Suspended_Interp on stack entry
        Delete stack entry and all related information
    End_On_Case
  End_While
End_Procedure
```

The following pseudo-code describes an example of the reset execution point 80 logic having features of the present invention. This routine may be used to forcibly reset the virtual execution point. It is assumed that a point of execution already exists, and a new statement number has been specified within the current routine as the next executable statement.

```
Procedure: Reset Execution Point
Begin_Procedure
  On case context change type
    case "new context==old context":
      Set interpreter to new statement
      continue
    case "new context precedes old context":
      for each stack context above the new one
        remove stack context from context list
        delete stack context and related information
      End_For
      Set interpreter to new statement
      continue
    case "new context succeeds old context":
      Locate new contexts in local dictionary
      Build new stack contexts to match each new context
      Insert context into context list appropriately
      Set interpreter to new statement
      continue
    case "new context is a sibling context":
      Determine highest context common to current execution and
        new context list
      Delete all stack contexts above the common context and the top
```

-continued

```
    Add all new contexts appropriately
    continue
  End_On_Case
End_Procedure
```

Figure 7A:
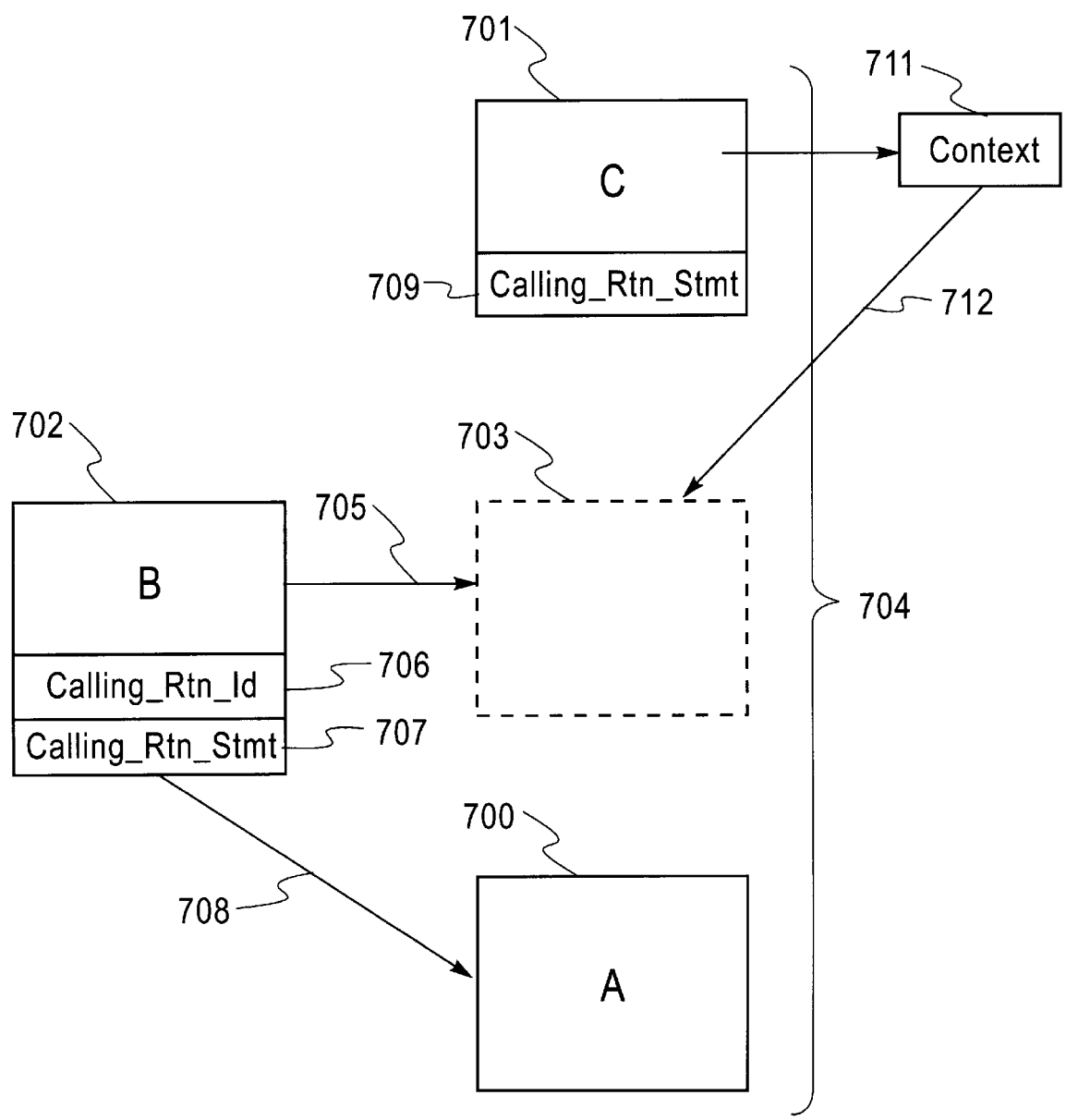
FIG. 7a depicts a block diagram of the insert caller into stack logic of FIG. 7.

FIG. 7a depicts an example of the insert caller into stack 81 logic in accordance with the present invention. The stack list 61 is initially comprised of two stack entries A 700 and C 701, with A calling C. The stack entry B 702 is to be inserted as a caller between A and B producing entry 703. First, a check 704 is made to determine if the insertion is legal. It must be determined that A 700 already calls the routine represented by B 702 at A's current statement, and that B 702 at its current statement calls C 701. If that is the case, the stack entry 702 is inserted 705 into the stack list. Next the Calling_Rtn_Id 706 and Calling_Rtn_Stmt 707 of B 702 must be updated 708 to reference A 700. Similarly the Calling_Rtn_Stmt 709 of C 701 must be updated 710 to reference B 702. Next the context 711 of C 701 is found that contains the routine's parameters. These are checked for parameters passed by reference which are then updated 712 appropriately to values from B 702.

The following pseudo-code describes another example of the insert caller into stack 81 logic having the features of the present invention. This routine is used to insert a caller anywhere in the stack, obeying consistency of calling within the stack. It is assumed that a calling routine and statement number has been specified along with the position within the virtual call stack to be inserted.

```
Procedure: Insert Caller into Stack
  Input Identity of routine to be inserted into to stack
      Indication of where in stack to insert entry
  Begin_Procedure
    if calling routine not in local dictionary
      Parser routine into local dictionary
    Build stack entry
    if stack predecessor exists and is not calling this routine or
        stack successor exists and is not called by the statement specified
        in new calling routine
      report error to user
      exit
    End_If
    Insert stack entry into stack
      If predecessor in stack exists
        Set Calling_Rtn_Id and Calling_Rtn_Stmt in new stack entry to
        reference predecessor
      If successor in stack exists
        Set Calling_Rtn_Stmt in successor entry to reference new stack
        entry
      End_If
    For the successor, adjust any input parameters passed by reference to
        reflect variables in the new stack entry
  End_Procedure
```

Figure 7B:
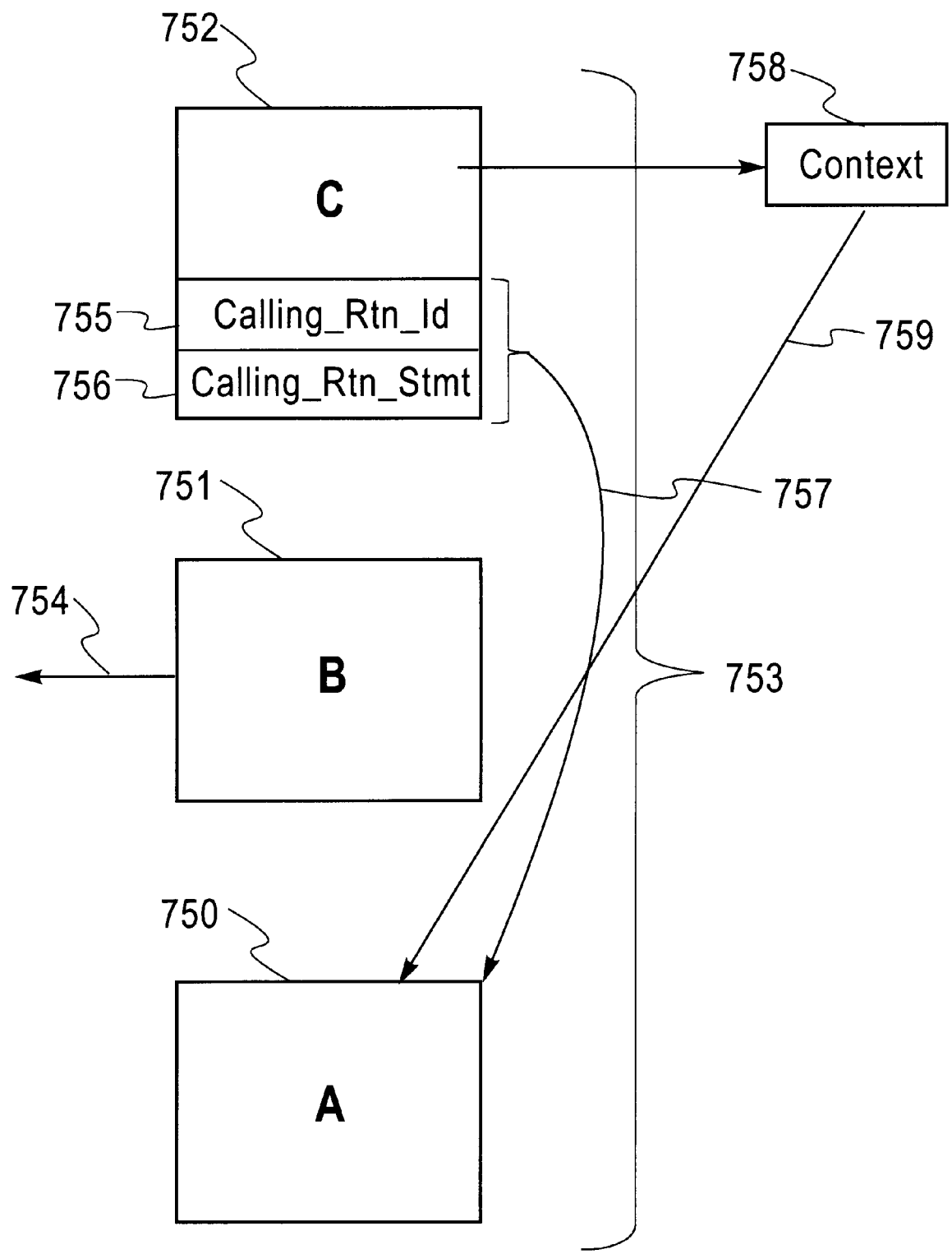
FIG. 7b depicts a block diagram of the delete caller from stack logic of FIG. 7.

FIG. 7b depicts an example of the delete caller from stack 82 logic in accordance with the present invention. The stack list contains three stack entries A 750 calling B 751 calling C 752. It is intended to remove B 751 from the stack list. First a check 753 is made to ensure that the removal is allowed. That check consists of ensuing that A 750 at its current statement references C 752. If that is true, the entry may be removed and deleted 754. Next the Calling_Rtn_Id 755 and Calling_Rtn_Stmt 756 of C 752 are updated 757 to reference A 750. After that the context 758 of C 752 holding the routine's parameters is found and it is checked for variables passed by reference. Those are changed 759 to reference corresponding values form A 750.

The following pseudo-code describes another example of the delete caller from stack 82 logic having features of the present invention. This routine is used to delete any entry from the stack, obeying consistency of calling within the stack.

```
Procedure: Delete Caller from Stack
  Input: Stack entry representing caller to be deleted from stack
  Begin_Procedure
    Locate respective Stack Entry
      If stack entry has predecessor and it is not calling the same routine
        specified by the successor (if it exists) of the target stack entry
      report error to user
      exit
    End_If
    Remove respective Stack Entry and delete it
    If the stack entry had a successor,
      Update the successor's Calling_Rtn_Stmt to refer to the deleted
      entry's predecessor
      If stack entry had a successor, adjust any input parameters passed by
      reference to reflect variables in the predecessor
  End_Procedure
```

Alternative Embodiments

Multi-Process/Multi_Thread

Multi-process and multi-thread support is achieved through a simple extension to the present invention. One extends the runtime to include the conventional notion of processes and threads, with each process having a set of threads. Each process has its own global 13 and local data dictionary 14, and its own virtual runtime memory and global variable management, and their dependent sub-structures. Each thread is assigned a stack list 16 and its dependent sub-structures. At the virtual execution services 10 level, one must extend primitive actions by specifying to which process and thread the action applies.

This extension also impacts error detection. The process and thread producing a violation should be identified on the error. For example, if execution on one thread over-writes memory that is associated with another thread (such as its stack), the victim process and thread should also be identified when the violating process and thread are reported as producing the error.

Test Data Composition

In order to enhance software testing utilizing virtual debugging, it is desirable to have a tool which could manufacture data structure instances of arbitrary complexity in an interactive fashion. These instances may be any composition of global data, local data, data structure instances, and data arrays. Since the specification of this information is complex, this tool would ideally have a graphical user interface to facilitate the contriving of complex data structure instances and relationships. It would also be capable of saving and retrieving this information from storage media. Finally, the virtual debugger should be able to retrieve these instances either directly from the tool as it is active, or from the saved information on storage media.

The technical details of this tool's construction and user interface, are fairly straight forward to one of skill in the art, and will not be discussed further herein. The interaction of this tool with the virtual program emulator however is a significant notion, which is now described with reference to FIG. 8.

While such a tool would be optimal and effective within a working environment, outside of its availability, other conventional tools could serve the same function, albeit less effectively. For example, one could use a standard text editor to define data structure instances and store them on standard storage media. The standard cut and paste operations could serve as the transport medium between the editor and the virtual program emulator 84. The virtual program emulator could as well read that data from storage media. In this scenario, referring to FIG. 8, the text editor would replace the data scenario editor 85.

Figure 8:
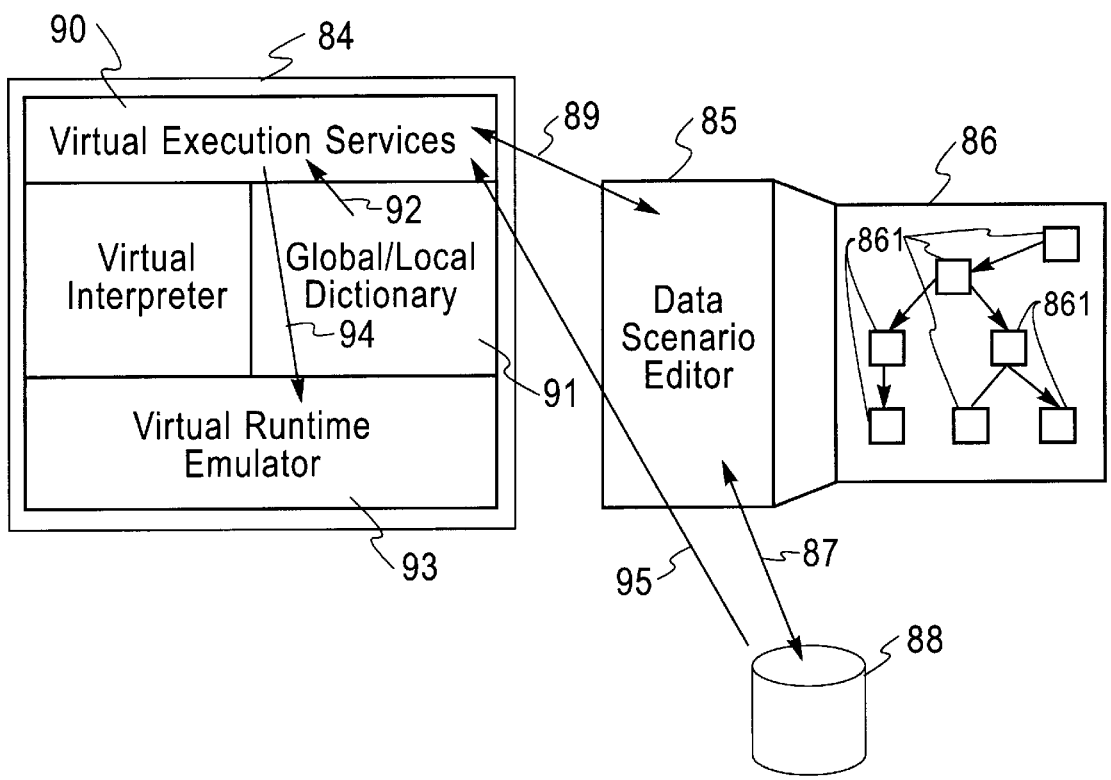
FIG. 8 depicts an example of a block diagram for the integration of test data in accordance with the present invention.

(Note: the representation of the virtual program emulator in FIG. 8 is somewhat different than that in FIG. 2. Here, the global and local dictionaries are combined. This is not to represent a different architecture, but only to simplify the discussion. The virtual program emulators of both FIGS. 2 and 8 represent the identical logical component.)

As depicted in FIG. 8, the virtual program emulator 84 interacts with the proposed tool, called the data scenario editor 85. The data scenario editor is shown having a graphical user interface 86, and an interaction 87 with a data repository 88. The data structure instances 861 depicted on the user interface 86 are conventionally stored to and retrieved from the data repository 88. The two aspects that are not unique in themselves are now presented for completion.

These tools may interact through any number of transport protocols 89 such as TCP/IP, local pipes, or through established middle wares or component technologies. The virtual execution services component 90 of the virtual program emulator 84 arbitrates communication for the virtual debugger. However, this decision simplifies the presentation.

The data scenario editor 85 interacts with the global and local dictionaries 91 by way of the data path 92 to the virtual execution services 90. This information is used to facilitate the manufacture of data structure instances. That is, the data scenario editor uses these definitions to provide data structure layouts to the granularity of individual single-valued fields for which the tool's user may specify values including reference values to other data structure instances.

The virtual program emulator 84 may request data structure instances from the data scenario editor at various times, such as when the virtual interpreter requests data for uninitialized references. In that transaction, data structure instance information is transferred from the data scenario editor to the virtual runtime emulator 93 by way of the data path 94 from the virtual execution services 90. In the virtual program emulator the instances are installed in the virtual runtime appropriately, by allocating sufficient virtual memory and copying explicit data into those areas.

In the absence of a data scenario editor tool, the virtual program emulator may retrieve pre-built data instances directly 95 from storage media 88. In this case all of the above activities occur as before with the virtual execution services reading data instance data directly from storage media.

Incorporation of Application Libraries

Thus far, virtual debugging has been presented for programs at a pure language level. That is, all application program functionality derives from language statement execution. As presented here, when a program is called that is inaccessible to the virtual program emulator, the user is asked to supply the source code for that program. There are many cases where these programs are pre-built and reside in libraries outside the domain of the current application, such as standard runtime libraries, or ancillary program libraries from other applications. Typically, the program source for these libraries is not available. Three solutions to this problem are presented here, all having various tradeoffs (depicted in FIGS. 9, 10, and 11).

Figure 9:
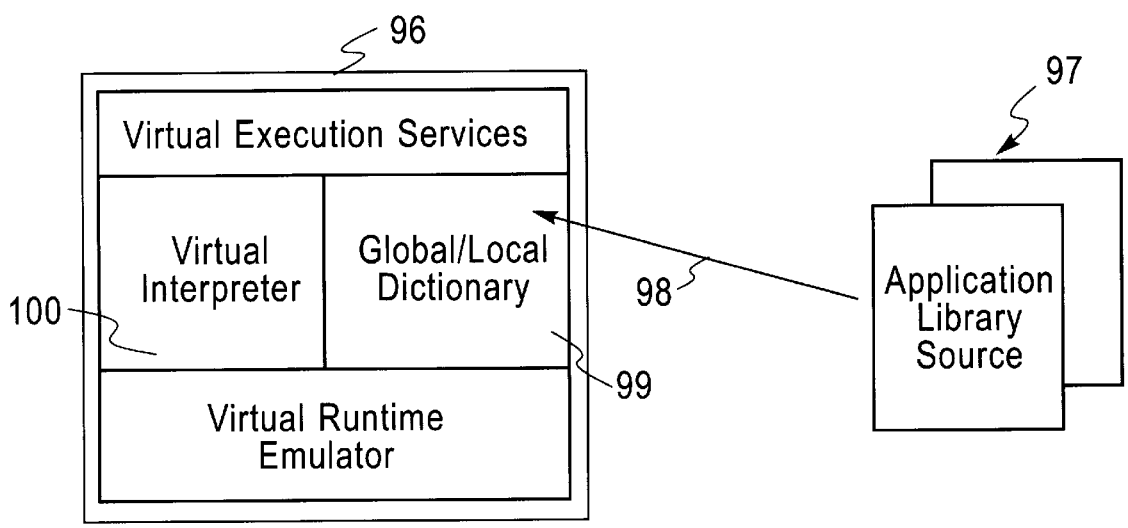
FIG. 9 depicts an example of a block diagram for the integration of application libraries into the virtual program emulator using library source.
Figure 10:
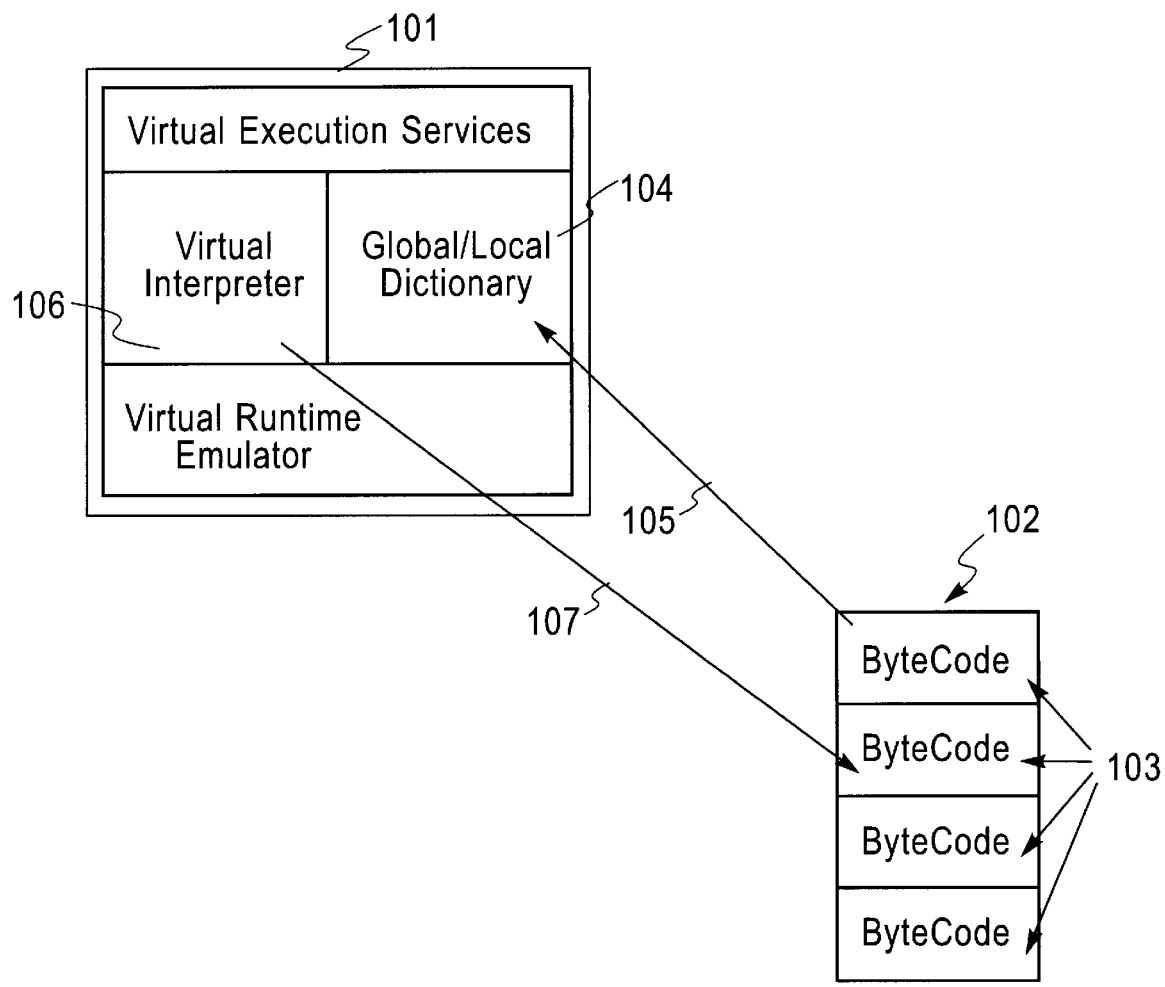
FIG. 10 depicts an example of a block diagram for the integration of application libraries into the virtual program emulator using bytecode versions of library source.
Figure 11:
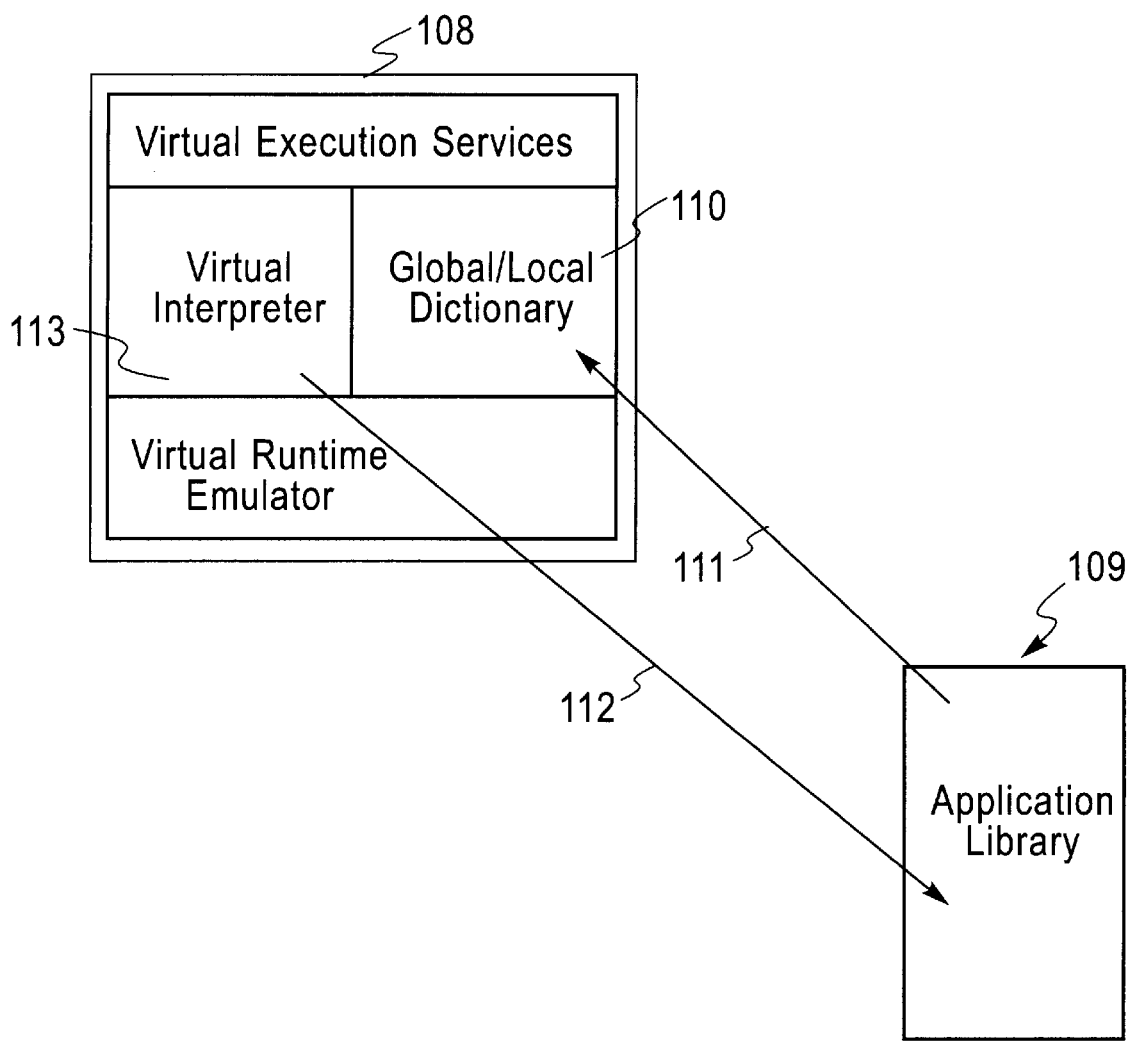
FIG. 11 depicts an example of a block diagram for the integration of application libraries into the virtual program emulator using a library's binary.

(Note: the representations of the virtual program emulator in FIGS. 9, 10 and 11 are somewhat different than that in FIG. 2. Here, the global and local dictionaries are combined. Those skilled in the art will appreciate that is not to represent a different architecture, but only to simplify the discussion. The virtual program emulators of these figures represent identical logical components.)

FIG. 9 depicts an example of a block diagram for the integration of application libraries into the virtual program emulator 96 using the library source 97, also called the source scenario. As depicted, the virtual program emulator 96 has access via data path 98 to the program content (source) for the library 97. In the source scenario, the application library source 97 is described to the virtual program emulator as program content holding the source of that library. Just as any program content is read and analyzed by the virtual program emulator, this source is similarly processed via the data path 98 to the global/local dictionary 99. Here, the virtual program emulator 96 functions as before, i.e., interacting with the specified program content appropriately on each call to routines within the library 97 by the virtual interpreter 100. At the expense of having the library source available, this approach adds no burden of additional function to the present invention as already defined.

FIG. 10 depicts an example of a block diagram for the integration of application libraries into the virtual program emulator using bytecode versions of library source, also called the bytecode scenario. Here, it is assumed that the library source 97 has been translated into a bytecode representation, which the virtual interpreter 106 is capable of executing. As depicted, the virtual program emulator 101 has access to via a data path 107 to an application library 102. The application library 102, which in this instance consists of a set of routines 103, each compiled into an interpretive bytecode. The global/local dictionary 104 reads the application library 102 via a data path 105 to determine the identity of the library's routines and thereby distinguish these routines from others. It is also assumed that the global dictionary is capable of determining all the global data instances defined within the library, i.e., the information encoded into the application library through a variant of the bytecode representation. This also applies to local dictionary information describing contexts and local variables, for example. When the interpreter 106 calls a routine 103 within the library, the interpreter reads the corresponding bytecode and executes accordingly. It is assumed that references to variables and virtual emulated memory, as well as operations specified by the bytecode are understood by the virtual program emulator. That is a detail beyond the scope of this discussion. In the bytecode scenario, one gains speed of execution at the expense of requiring a re-compilation phase for the library source. One also gains the ability to distribute program libraries without distributing the source programs for it. On the other hand, this approach requires a new type of compiler to be designed for this re-compilation, as well as moderate changes to the architecture of the virtual program emulator to accommodate the bytecode interpretation.

FIG. 11 depicts an example of a block diagram for the integration of application libraries into the virtual program emulator using a library's binary, also called the binary scenario. In this scenario, the library 109 is utilized by the virtual program emulator 108 in a binary distributed format. For example the application library 109 could be compiled into a standard machine code representation through standard compilation techniques. It is assumed that the library 109 in this format is callable from the virtual program emulator 108. As in the other scenarios, the global/local dictionary 110 has access via a data path 111 to the list of routines within the application library, presumably by reading and analyzing it. As depicted, a call via a data path 112 to a routine within the library 109 by the virtual interpreter 113 directly calls the routine in the library, being careful to pass real memory addresses when requested. The advantages of this approach are that the libraries need not be modified, their source programs need not be distributed, and execution speed would be high. The disadvantage is that the application library 109 may corrupt the internals of the virtual program emulator 108. Since the library has direct access to memory used by the emulator, and errant library code could easily disrupt the normal functioning of it through memory over-writes, or continuous looping.

In practice, application library support is likely to be achieved through some combination of the above, with in some cases vendors selling altered binary libraries that do extensive checking before preforming function.

Various optimizations may be made to the foregoing design. These optimizations address issues of improving processing speed and memory usage. While these would constitute utility improvements to the methods, and involve complexity of design, they are not essential to the basic methods described hereinbefore.

Standard Debugging Operations

Standard debugging features may be added to the foregoing design. This includes breakpoints, variable monitoring, and memory monitoring. While these would constitute utility improvements to virtual debugging they are not essential to the basic methods described hereinbefore.

Saving and Restoring Runtime State

Methods for storing and retrieving incompletely assembled runtime states using local or remotely attached storage media is very useful in recreating debugging scenarios in complex debugging situations. The implementation of this feature is achieved by storing in a structured fashion all information currently in the runtime, plus any data dictionary information necessary to reconstruct the state. Retrieval is simply the reverse of the storing logic. A simple resetting of the virtual interpreter would complete the setting of the debug state to what it was at the time it was stored.

Now that the invention has been described by way of a preferred embodiment, with alternatives, various modifications and improvements will occur to those of skill in the art. Thus, it should be understood that the detailed description has been provided as an example and not as a limitation. The proper scope of the invention is defined by the claims.

I claim:

1. A computerized method of non-sequential program statement execution, comprising the steps of:
  executing an arbitrary program instruction associated with a given program, independently of a program execution sequence associated with the given program, as an initially executed statement; and
  instantiating a runtime stack for the given program with a first stack entry associated with the initially executed statement, such that at least a portion of the given program may be tested.

2. The method of claim 1, further comprising the step of instantiating a global data instance if the initial statement includes a global data reference.

3. The method of claim 2, further comprising the step of instantiating the global data instance with an uninitialized value.

4. The method of claim 3, further comprising the step of communicating an input request for a value to replace the uninitialized value.

5. The method of claim 1, further comprising the step of executing successive statements anywhere within a current routine in an arbitrarily selected manner.

6. The method of claim 1, wherein the program execution is interpretive, and wherein said executing step comprises the step of instantiating a global data dictionary (GDD) including a first GDD entry associated with the initial statement.

7. The method of claim 1, wherein the program execution is interpretive, and wherein said executing step comprises the step of instantiating a local data dictionary (LDD) including a first LDD entry associated with the initial statement.

8. The method of claim 1, further comprising the step of instantiating a local data instance if the initial statement includes a local data reference.

9. The method of claim 8, further comprising the step of instantiating the local data instance with an uninitialized value.

10. The method of claim 9, further comprising the step of communicating an input request for a value to replace the uninitialized value.

11. The method of claim 1, further comprising the steps of:
  detecting an execution error in response to said executing step; and
  communicating a request for user input to assist in the program execution.

12. The method of claim 1, further comprising the steps of:
  inserting into the runtime stack a calling routine at a current statement; and
  maintaining stack consistency in response to said inserting step.

13. The method of claim 12, wherein said inserting step further comprises the steps of:
  determining if a stack predecessor exists having a current statement which calls the calling routine; and
  determining if a stack successor exists and that the calling routine at its current statement calls the stack successor.

14. The method of claim 1, further comprising the steps of:
  deleting from the runtime stack a calling routine at a current statement; and
  maintaining stack consistency in response to said deleting step.

15. The method of claim 14, wherein said deleting step further comprises the steps of:
  determining if both a stack predecessor and a stack successor exists, wherein the stack predecessor has a current statement which calls the successor routine.

16. The method of claim 1, further comprising a multi-process and multi-thread execution environment.

17. The method of claim 1, further comprising the steps of:
  loading one of global data, local data, data structure instances, and data arrays into the runtime through an editor.

18. The method of claim 1, further comprising the steps of:
  loading one of global data, local data, data structure instances, and data arrays into the runtime from a memory.

19. The method of claim 1, further comprising the step of executing an application library, which includes a source code, by referencing the source code.

20. The method of claim 1, further comprising the step of directly executing an application library.

21. The method of claim 2, further comprising the step of storing one of the runtime stack, the global data instance, and an allocated data instance to a memory.

22. The method of claim 2, further comprising the step of retrieving one of the runtime stack, the global data instance, and an allocated data instance from a memory.

23. A computer system, comprising:
a memory including a plurality of computer executable program statements associated with a given program; and
virtual debugger means, coupled to the memory, for non-sequential program statement execution, independent of a program execution sequence associated with the given program, in an incompletely assembled runtime environment, such that at least a portion of the given program may be tested.

24. The system of claim 23, wherein the virtual debugger means further comprises:
virtual program emulator (VPE) means for executing an initial statement at an arbitrary program point and instantiating a runtime stack in the memory with a first stack entry associated with the initial statement; and
virtual runtime emulator (VRE) means, coupled to said VPE means, for managing a program runtime state instantiated by said VPE means.

25. The system of claim 24, further comprising:
said VPE means comprising virtual interpreter (VI) means for instantiating in the memory a global data dictionary including a global data instance if the initial statement includes a global data reference.

26. The system of claim 25, further comprising:
a user interface;
said VPE means coupled to said user interface;
said VPE means comprising virtual execution services (VES) means for interpreting and executing commands input through said user interface;
said VI means coupled to said VES means, said VI means further comprising:
means for instantiating the global data instance with an uninitialized value; and
means for communicating an input request to the interface for a value to replace the uninitialized value.

27. The system of claim 24, said VPE means further comprising means for executing successive statements anywhere within a current routine in an arbitrarily selected manner.

28. The system of claim 24, wherein the program execution is interpretive.

29. The system of claim 26, wherein said virtual interpreter (VI) means comprises means for instantiating in the memory a local data dictionary (LDD) including a local data instance if the initial statement includes a local data reference.

30. The system of claim 29, said VI means further comprising:
means for instantiating the local data instance with an uninitialized value; and means for communicating to the interface an input request for a value to replace the uninitialized value.

31. The system of claim 24, said VPE means further comprising:
means for detecting an execution error of the initial statement; and
means for communicating a request for user input to assist in the initial statements execution.

32. The system of claim 26, said VES means further comprising:
means for inserting a caller into the stack, including:
means for inserting into the runtime stack a calling routine at a current statement;
means for maintaining stack consistency, coupled to said means for inserting;
means for determining if a stack predecessor exists having a current statement which calls the calling routine; and
means for determining if a stack successor exists and that the calling routine at its current statement calls the stack successor.

33. The system of claim 26, said VES means further comprising:
means for deleting a caller from the stack, including:
means for deleting from the runtime stack a calling routine at a current statement;
means for maintaining stack consistency in response to said deleting step; and
means for determining if both a stack predecessor and a stack successor exists, wherein the stack predecessor has a current statement which calls the successor routine.

34. The system of claim 23, further comprising a multi-process and multi-thread execution environment.

35. The system of claim 26, further comprising:
editor means, coupled to said VPE means, for loading one of global data, local data, data structure instances, and data arrays into said VRE means.

36. The system of claim 24, further comprising:
an application library source including a source code, coupled to said VPE means;
said VPE means including means for referencing and executing the source code.

37. The system of claim 24, further comprising:
an application library source including a binary code, coupled to said VPE means; and
said VPE means including means for referencing and directly executing the binary code.

38. The system of claim 29, said VPE means further comprising means for saving to and restoring from the memory, one of the runtime stack, the global data instance, and an allocated data instance.

39. A computerized method of non-sequential program statement execution, comprising the steps of:
executing an initial statement of a given program, independently of a program execution sequence associated with the given program; and
executing one or more successive statements in an arbitrarily selected manner, independently of the program execution sequence associated with the given program, such that at least a portion of the given program may be tested.

40. Apparatus for performing non-sequential program statement execution, the apparatus comprising:
at least one computer processing device operative to: (i) execute an arbitrary program instruction associated with a given program, independently of a program execution sequence associated with the given program, as an initially executed statement, and (ii) instantiate a runtime stack for the given program with a first stack entry associated with the initially executed statement, such that at least a portion of the given program may be tested.

* * * * *